(12) United States Patent
Chen

(10) Patent No.: US 6,477,604 B1
(45) Date of Patent: Nov. 5, 2002

(54) COMPUTER MULTI-BAY DEVICES COMPATIBLE EXPANSION MODULE AND ITS PROCESSING PROCEDURE

(75) Inventor: Chung-Hui Chen, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/531,432

(22) Filed: Mar. 20, 2000

(51) Int. Cl.⁷ ............................................... G06F 13/00
(52) U.S. Cl. ..................... 710/301; 710/303; 361/683; 361/684; 361/686; 361/687
(58) Field of Search ................. 710/300–304; 361/683–687

(56) References Cited

U.S. PATENT DOCUMENTS

| | | | | |
|---|---|---|---|---|
| 5,708,840 A | * | 1/1998 | Kikinis et al. | 341/137 |
| 5,768,100 A | * | 6/1998 | Barrus et al. | 361/686 |
| 5,805,412 A | * | 9/1998 | Yanagisawa et al. | 361/686 |
| 5,948,077 A | * | 9/1999 | Choi et al. | 340/825.52 |
| 6,078,112 A | * | 6/2000 | Saunders et al. | 307/116 |
| 6,134,104 A | * | 10/2000 | Mohi et al. | 165/185 |
| 6,145,029 A | * | 11/2000 | Deschepper et al. | 710/303 |

* cited by examiner

Primary Examiner—Rupal Dharia
(74) Attorney, Agent, or Firm—Bacon & Thomas, PLLC

(57) ABSTRACT

A computer multi-bay devices compatible expansion module includes a housing defining a chamber for receiving a notebook computer multi-bay compatible device, for example, a CD-ROM, DVD-ROM, hard disk driver, or chargeable battery, a set of control buttons, a control circuit board disposed inside the chamber in the housing and controlled by the control buttons to operate the notebook computer multi-bay compatible device being inserted into the chamber in the housing, so as to play a music CD, game CD or DVD, access hard disk data, or charge a chargeable battery.

11 Claims, 5 Drawing Sheets

COMPUTER MULTI-BAY DEVICES COMPATIBLE EXPANSION MODULE AND ITS PROCESSING PROCEDURE

BACKGROUND OF THE INVENTION

The present invention relates to a computer multi-bay devices compatible expansion module, which has control buttons and control circuit means for controlling the operation of a notebook computer multi-bay compatible device being inserted therein. The invention relates also to the processing procedure of the computer multi-bay devices compatible expansion module.

Following the popularity of computer, information distribution speed has been accelerated. People working in different fields may have to use a computer in handling a variety of things and processing different data. Nowadays, notebook computer has become more and more popularly invited for the advantage of high mobility. It can be expected very shortly that everyone have a notebook computer.

A regular notebook computer 10, as shown in FIG. 1, comprises multi-bay slots 11 for receiving compatible devices 12 such as CD-ROM, DVD-ROM, hard disk driver, chargeable battery, and etc. The user can insert a multi-bay compatible device 12 in one multi-bay slot 11, enabling the notebook computer 10 to run the desired work. If a prepared multi-bay compatible device 12 is not installed in the notebook computer 10, it is workless, and a particular storage space must be provided to receive the prepared multi-bay compatible device 12.

SUMMARY OF THE INVENTION

The present invention has been accomplished under the circumstances in view. According to the present invention, the computer multi-bay devices compatible expansion module comprises a chamber for receiving a notebook computer multi-bay compatible device, for example, a CD-ROM player, DVD-ROM player, hard disk driver, or chargeable battery, a set of control buttons disposed outside the chamber, and a control circuit board disposed inside the chamber and controlled by the control buttons to operate the notebook computer multi-bay compatible device being inserted into the chamber, so as to, for example, play a music CD, game CD or DVD, access hard disk data, or charge a chargeable battery.

DETAILED DESCRIPTION OF THE PREFERRED EMBODIMENT

Figure 1:
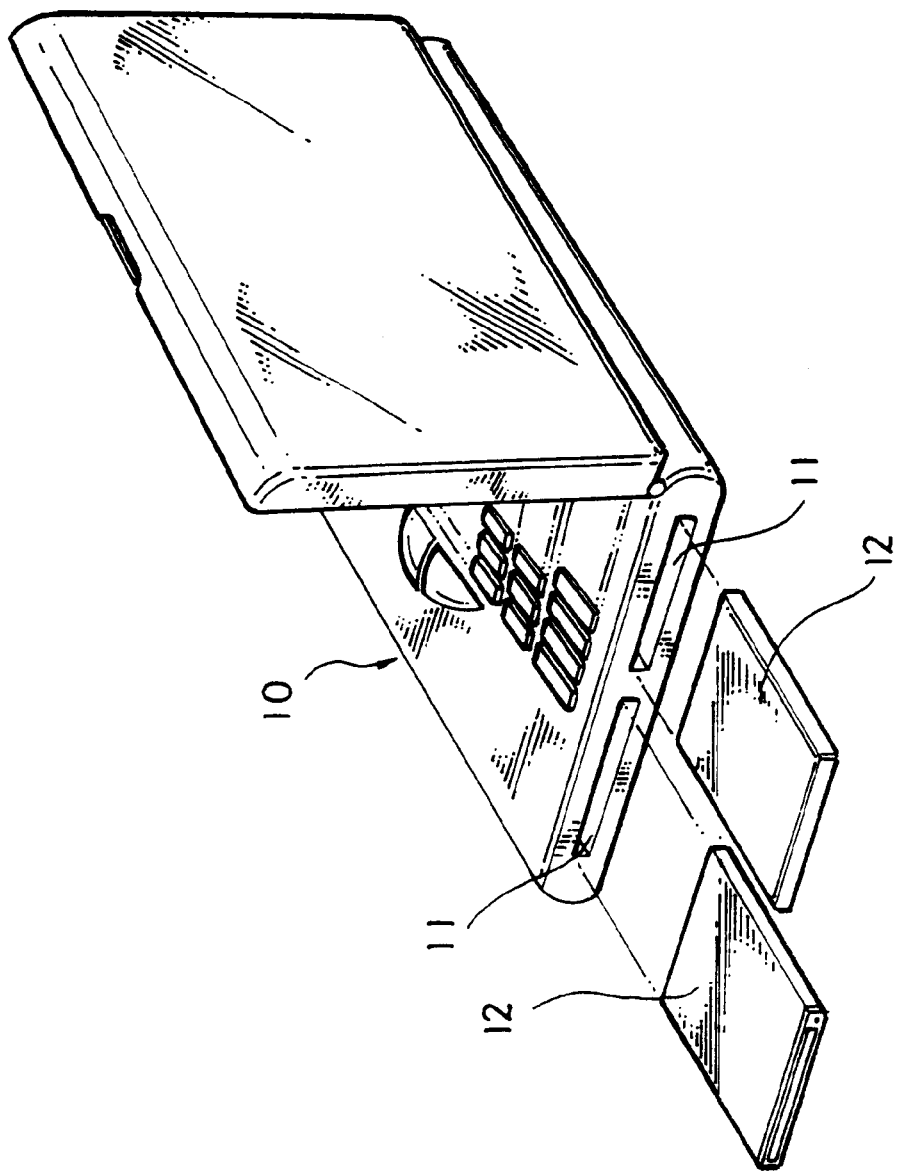
FIG. 1 illustrates the use of a conventional notebook computer with notebook computer multi-bay compatible devices.
Figure 2:
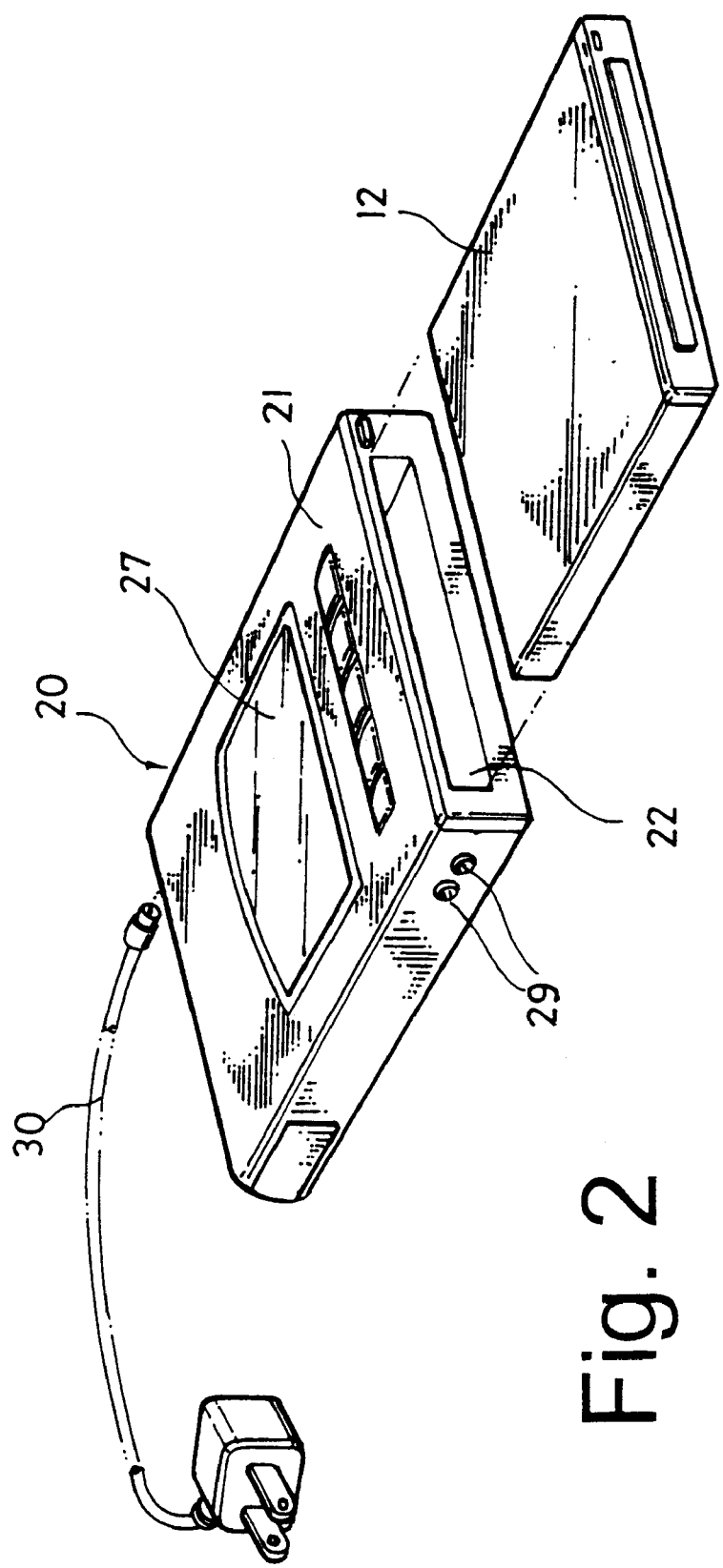
FIG. 2 illustrates the use of a computer multi-bay devices compatible expansion module with a notebook computer multi-bay compatible device according to the present invention.
Figure 3:
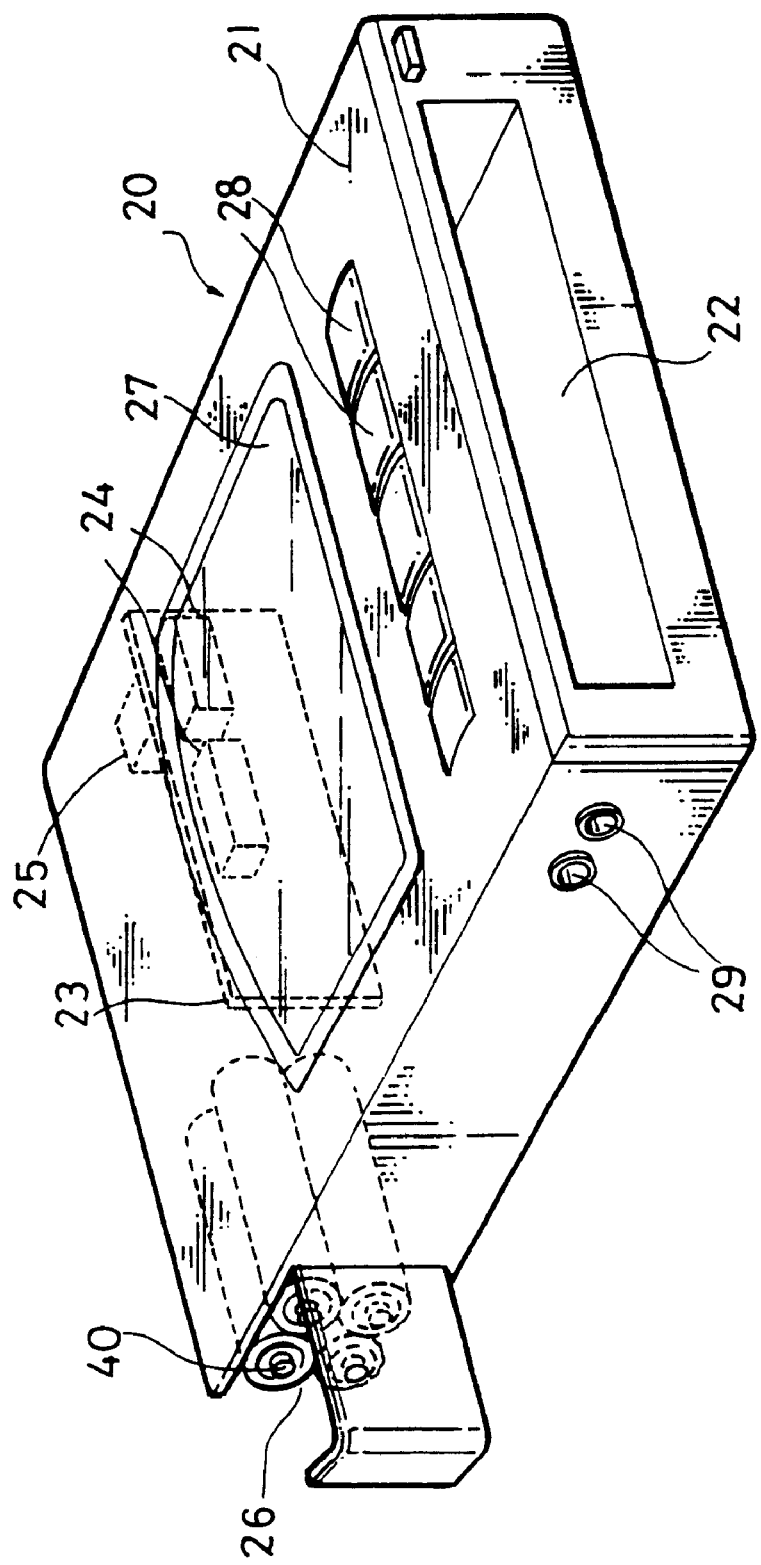
FIG. 3 is a perspective view of the computer multi-bay devices compatible expansion module according to the present invention.

Referring to FIGS. 2 and 3, a computer multi-bay devices compatible expansion module 20 is shown comprising a housing 21 defining a chamber 22 for receiving a notebook computer multi-bay compatible device 12, for example, a CD-ROM, DVD-ROM, hard disk driver, or chargeable battery, and a control circuit board 23 mounted inside the chamber 22. The control circuit board 23 comprises at least one electric connector 24 for receiving input/output terminal means (not shown) of the device 12 installed in the chamber 22 and providing the necessary working voltage and operation control signal to the device 12, enabling output signal of the device 12 to be transmitted to the control circuit board 23 for further processing.

A power terminal 25, a battery box 26, a display panel 27, control buttons 28, and input output terminals 29 are respectively mounted in the housing 21, and electrically connected to the control circuit board 23. The power terminal 25 receives an external power converter 30, which provides the expansion module 20 with the necessary working power supply. The battery box 26 holds stand-by battery 40, which provides the expansion module 20 with the necessary working power supply when external power supply is not available. The display panel 27 is for the display of status data during the operation of the device 12. The control buttons 28 enable the user to control the operation of the device 12, enabling processed signal (audio, video and other data signal to be sent from the control circuit board 23 through the input output terminals 29 to external peripheral apparatus (speakers, television or other input output apparatus). Thus when the device (CD-ROM, DVD-ROM, hard disk driver, or chargeable battery) 12 is not inserted into the multi-bay of the notebook computer, it can be operated through the expansion module 20 to play music CD, game CD or DVD, to access hard disk data, or to charge chargeable battery.

Figure 4:
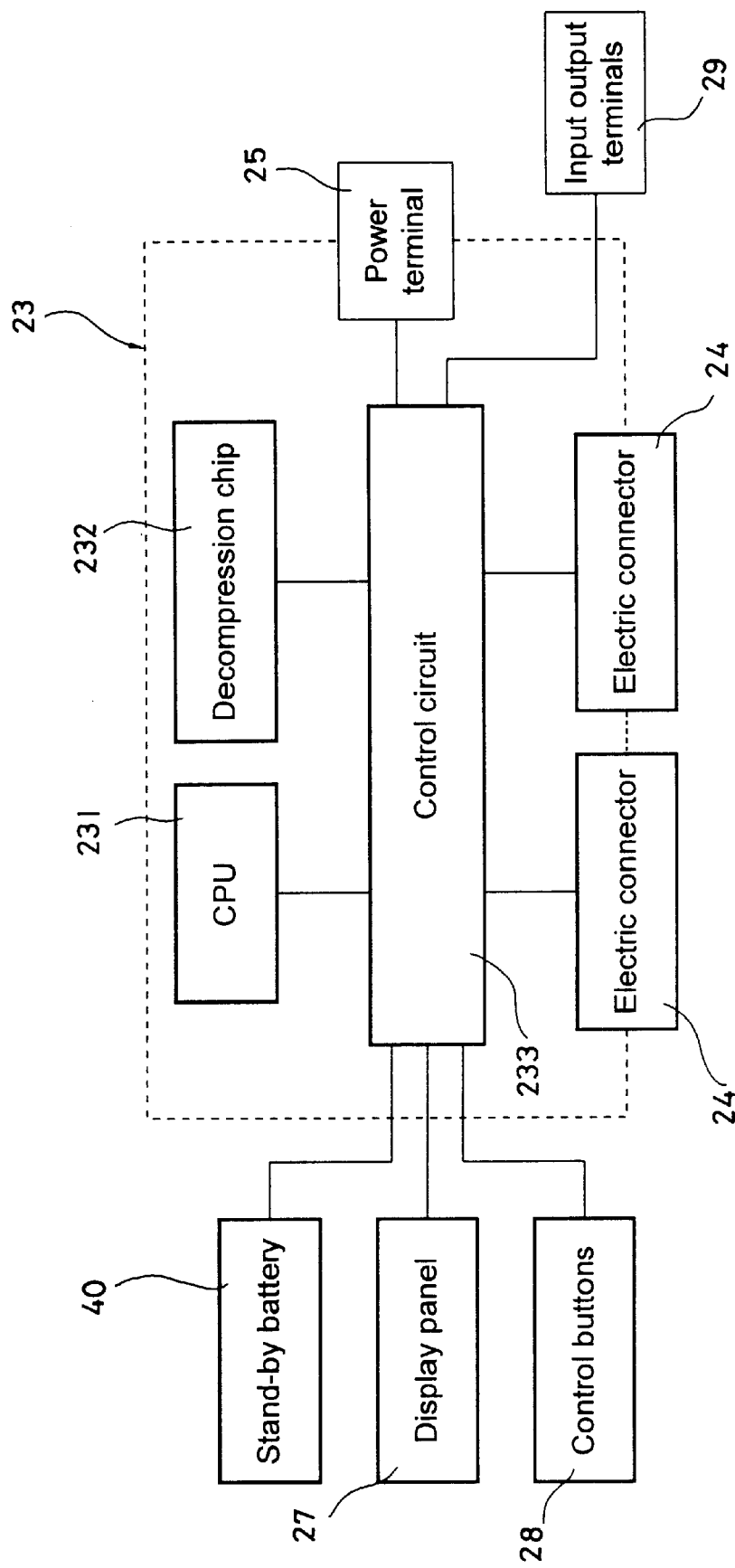
FIG. 4 is a circuit block diagram of the computer multi-bay devices compatible expansion module according to the present invention.
Figure 5:
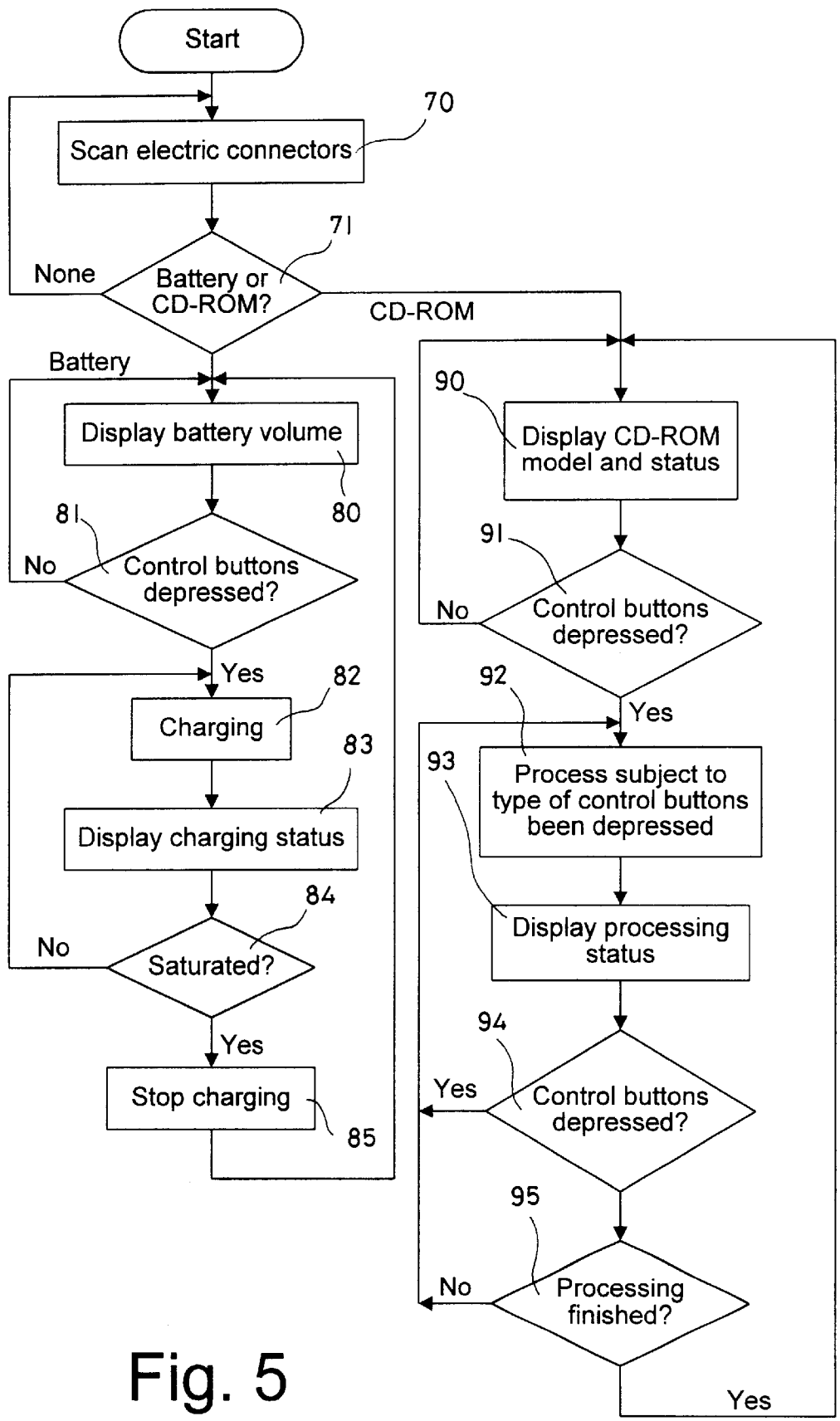
FIG. 5 is a flow chart explaining the operation procedure of the computer multi-bay devices compatible expansion module according to the present invention.

Referring to FIG. 4, the control circuit board 23 comprises a CPU (Central Processing Unit) 231, an AV decompressing chip 232, and a control circuit 233. The control circuit 233 is disposed in communication with the power terminals 25, stand-by battery 40, display panel 27, control buttons 28, input output terminals 29, and electric connector 24. The CPU 231 drives the control circuit 233 to control the operation of the other elements, and to drives the AV decompressing chip 232 to decompress AV signal transmitted from the device 12 into peripheral apparatus (speaker, TV, and etc.,) readable signal for further output.

During normal operation of the expansion module 20, the device 12 is inserted into the chamber 22, the power control button of the control buttons 28 is pressed to turn on power supply, enabling the CPU 231 of the control circuit board 23 to proceed with the following control procedure:

When started, it proceeds to step (70) where the control circuit 233 scans signal transmitted from the electric connector 24, and then proceeds to step (71) where a judgment is made to determine whether the device 12 inserted into the chamber 22 of the expansion module 20 is a chargeable battery or any other devices (for example, CD-ROM, DVD-ROM, or hard disk driver), and then it proceeds to step (80) if the inserted device is a chargeable battery, or to step (90) if the inserted device is not a chargeable battery. When entering step (80), it scan the battery volume of the chargeable battery, and displays the reading on the display panel 27. After step (80), it enters step (81) to scan the position of the control buttons 28, and then returns to step (80) if the control buttons 28 are not depressed, or proceeds to step (82) where the chargeable battery is charged, and then to step (83) where the chargeable battery charging status is shown on the display panel 27. After step (83), it enters step (84) to scan the amount of electricity of the chargeable battery, and then proceeds to step (85) to stop charging operation after the chargeable battery reached the saturated status, and then returns to step (80) after the charging operation has been stopped. If the chargeable battery is not in the saturated status during step (84), it immediately returns to step (82) to continuously charge the chargeable battery. When entering step (90), it detects the model and status of the device (for example, the model of CD-ROM player and the type of disk installed therein), and shows the detection result on the display panel 27. After step (90), it proceeds to step (91) to scan the position of the control buttons 28, and then returns to step (90) if the control buttons 28 are not depressed, or proceeds to step (92) where the device is operated subject to the function settings of the control buttons 28 (for example, reproduction, fast forward, fast reverse, pause, stop, and etc.), and then to step (93) where the operation status of the device is shown on the display panel 27. After step (93), it proceeds to step (94) to scan the position of the control buttons 28 again, and then returns to step (92) to operate the device subject to the function settings of the control buttons 28 if the control buttons 28 are depressed, or proceeds to step (95) if the control buttons 28 are not depressed. When entering step (95), it judges if the device has finished the operation set by the control buttons 28, and then returns to step (90) if positive, or returns to step (92) if negative.

If the user does not insert the device (CD-ROM, DVD-ROM, or chargeable battery) in the multi-bay of the notebook computer, the device can be installed in the expansion module 20 and operated, enabling the expansion module 20 to play music CD, game CD or DVD, or to charge chargeable battery.

It is to be understood that the drawings are designed for purposes of illustration only, and are not intended for use as a definition of the limits and scope of the invention disclosed.

What the invention claimed is:

1. A computer multi-bay devices compatible expansion module comprising
   a housing defining a chamber for receiving a notebook computer multi-bay compatible device;
   a control circuit board installed in said housing at a bottom side of said chamber, said control circuit board comprising at least one electric connector for receiving input/output terminal means of a notebook computer multi-bay compatible device being inserted into the chamber in said housing, and providing the necessary working voltage and operation control signal to the notebook computer multi-bay compatible device, enabling output signal of installed notebook computer multi-bay compatible device to be transmitted to said control circuit board for processing;
   a power terminal installed in said housing and connected to said control circuit board for receiving an external power converter, which provides the expansion module with the necessary working power supply; and
   at least one control button installed in said housing and connected to said control circuit board for enabling the user to control the operation of the installed notebook computer multi-bay compatible device, so as to let control circuit board processed signal be sent from said control circuit board through said input output terminal means of the installed notebook computer multibay compatible device to external peripheral apparatus.

2. The computer multi-bay devices compatible expansion module of claim 1 further comprising a battery box installed in said housing and connected to said control circuit board for holding a stand-by battery to provide the expansion module with the necessary working power supply when external power supply is not available.

3. The computer multi-bay devices compatible expansion module of claim 1 further comprising a display panel installed in said housing and connected to said control circuit board for the display of status data during the operation of the installed notebook computer multi-bay compatible device.

4. The computer multi-bay devices compatible expansion module of claim 1 wherein the installed notebook computer multi-bay compatible device is a CD-ROM.

5. The computer multi-bay devices compatible expansion module of claim 1 wherein the installed notebook computer multi-bay compatible device is a hard disk driver.

6. The computer multi-bay devices compatible expansion module of claim 1 wherein the installed notebook computer multi-bay compatible device is a chargeable battery.

7. A computer multi-bay devices compatible expansion module processing procedure including the step of inserting a notebook computer multi-bay compatible device in a chamber in a computer multi-bay devices compatible expansion module, and the step of driving the CPU (central processing unit of the computer multi-bay devices compatible expansion module to process the following procedure:

i) scanning signal transmitted from the installed notebook computer multi-bay compatible device, and then judging if the installed notebook computer multi-bay compatible device is a chargeable battery or not, and then proceeding to the following step ii) if the installed notebook computer multi-bay compatible device is a chargeable battery, or proceeding to the following step iii) if the installed notebook computer multi-bay compatible device is not a chargeable battery;

ii) scanning the battery volume of the chargeable battery, and displaying the scanned reading on a display panel of the expansion module, and then scanning the position of control buttons of the expansion module and judging if the control buttons have been depressed or not, and then charging the chargeable battery and displaying the charging status on the display if the control buttons have been depressed, or returning to charge the rechargeable battery again;

iii) scanning the installed notebook computer multi-bay compatible device to check its model and status and to display the scanned result on the display panel of the expansion module, and then scanning the position of the control buttons to check if the control buttons have been depressed or not, and then operating the installed notebook computer multi-bay compatible device subject to the function settings of the control buttons, enabling the operation status to be shown on the display panel of the expansion module, and then proceeding to the following step iv); and iv) judging if the notebook computer multi-bay compatible device has finished the operation set by the control buttons, and then returning to step iii) to scan the installed notebook computer multi-bay compatible device again and to display the scanned result on the display panel of the expansion module again if positive, or returning to operate the installed notebook computer multi-bay compatible device subject to the function settings of the control buttons for enabling the operation status to be shown on the display panel of the expansion module, and then proceeding to the step iv) again if negative.

8. The computer multi-bay devices compatible expansion module processing procedure of claim 7 wherein if the control buttons are scanned not depressed during step ii), it continuously scans the battery volume of the chargeable battery, and displays the scanned charging status on the display panel of the expansion module.

9. The computer multi-bay devices compatible expansion module processing procedure of claim 7 wherein after operating the installed notebook computer multi-bay compatible device subject to the function settings of the control buttons been depressed during step iii), the expansion module keeps judging if the control buttons have been depressed again or not, and then operates the installed notebook computer multi-bay compatible device again subject to the new function settings of the control buttons if the control buttons have been depressed again.

10. The computer multi-bay devices compatible expansion module processing procedure of claim 7 wherein the notebook computer multi-bay compatible device is a CD-ROM.

11. The computer multi-bay devices compatible expansion module processing procedure of claim 7 wherein the notebook computer multi-bay compatible device is a hard disk driver.

* * * * *